US012530430B2

(12) United States Patent
Buda et al.

(10) Patent No.: US 12,530,430 B2
(45) Date of Patent: Jan. 20, 2026

(54) DETECTING A USER'S OUTLIER DAYS USING DATA SENSED BY THE USER'S ELECTRONIC DEVICES

(71) Applicant: KOA HEALTH DIGITAL SOLUTIONS S.L.U., Barcelona (ES)

(72) Inventors: Teodora Sandra Buda, Barcelona (ES); Aleksandar Matic, Lloret de Mar (ES); Oliver Harrison, London (GB)

(73) Assignee: KOA HEALTH DIGITAL SOLUTIONS S.L.U., Barcelona (ES)

( * ) Notice: Subject to any disclaimer, the term of this patent is extended or adjusted under 35 U.S.C. 154(b) by 981 days.

(21) Appl. No.: 17/549,466

(22) Filed: Dec. 13, 2021

(65) Prior Publication Data
US 2022/0101072 A1    Mar. 31, 2022

Related U.S. Application Data

(63) Continuation-in-part of application No. PCT/EP2020/087426, filed on Dec. 21, 2020.

(30) Foreign Application Priority Data

Dec. 20, 2019 (EP) .................................... 19383169

(51) Int. Cl.
*G06N 20/00* (2019.01)
*G06F 18/10* (2023.01)
(Continued)

(52) U.S. Cl.
CPC ............ *G06F 18/214* (2023.01); *G06F 18/10* (2023.01); *G06F 18/22* (2023.01); *G06N 20/00* (2019.01); *G06Q 30/0201* (2013.01)

(58) Field of Classification Search
CPC ........ G06F 18/214; G06F 18/10; G06F 18/22; G06F 18/254; G06N 20/00;
(Continued)

(56) References Cited

U.S. PATENT DOCUMENTS

2012/0130196 A1* 5/2012 Jain ..................... A61B 5/45
                                                        600/300
2014/0099614 A1* 4/2014 Hu ...................... G09B 19/00
                                                        434/236
(Continued)

FOREIGN PATENT DOCUMENTS

AU    2017371391      12/2016
WO    WO2018/102867   12/2017
WO    WO2019/086856   10/2018

OTHER PUBLICATIONS

International Search Report dated Mar. 16, 2021, from the European Patent Office in the priority International Patent Application PCT/EP2020/087426 (3 pages).

*Primary Examiner* — Jordany Nunez
(74) *Attorney, Agent, or Firm* — MARSHALL, GERSTEIN & BORUN LLP

(57) ABSTRACT

A method for detecting a user's outlier days uses data corresponding to features of the user acquired over multiple days by sensors on the user's electronic device. The data acquired for each day and feature is labeled as regular or irregular by applying N labeling approaches. One of the N labeling approaches compares the data for each feature with how values of previously acquired data for corresponding features are distributed. N labels are generated for the data for each feature and day. The machine learning classification model is trained using one of the N labels for each of the N labeling approaches. An optimal labeling approach is selected from among the N labeling approaches for each feature using the machine learning classification model. For each feature, the method determines whether each of the days is an outlier day for the user using the labels obtained with the optimal labeling approach.

19 Claims, 7 Drawing Sheets

(51) Int. Cl.
*G06F 18/214* (2023.01)
*G06F 18/22* (2023.01)
*G06Q 30/0201* (2023.01)

(58) Field of Classification Search
CPC ........... G06Q 30/0201; G06Q 30/0261; G06Q 30/0244; G06Q 30/0255; G06Q 30/0269
See application file for complete search history.

(56) References Cited

U.S. PATENT DOCUMENTS

| | | | |
|---|---|---|---|
| 2015/0370994 A1* | 12/2015 | Madan | G16H 15/00 705/3 |
| 2017/0132383 A1* | 5/2017 | Myers | G06F 3/04847 |
| 2017/0249434 A1* | 8/2017 | Brunner | G16H 50/30 |
| 2019/0117143 A1* | 4/2019 | Fedor | A61B 5/165 |
| 2019/0365332 A1* | 12/2019 | Fedichev | A61B 5/11 |
| 2020/0387797 A1* | 12/2020 | Ryan | G06N 3/084 |
| 2021/0182868 A1* | 6/2021 | Zhang | G06Q 10/0633 |
| 2021/0383926 A1* | 12/2021 | Reid | G16H 50/30 |

* cited by examiner

| INPUT FEATURES | | | | TARGET FEATURE |
|---|---|---|---|---|
| battery_level | light_level | steps_count | noise_level | happiness_level (between 0 and 10) |
| 85 | 85 | 4000 | 10 | 10 |
| 10 | 20 | 100 | 70 | 2 |
| 10 | 10 | 4000 | 30 | 6 |
| 40 | 40 | 1000 | 60 | 5 |

INPUT FEATURES AND
CORRESPONDING TARGET FEATURE

FIG. 5

| SYNTHETIC INPUT FEATURES | | | | SYNTHETIC TARGET FEATURE |
|---|---|---|---|---|
| battery_level synthetic | light_level synthetic | steps_count synthetic | noise_level synthetic | happiness_level_synth (between 0 and 10) |
| 1 | 1 | 1 | 0 | 1 |
| 0 | 0 | 0 | 1 | 0 |
| 0 | 0 | 1 | 2 | 2 |
| 2 | 2 | 2 | 1 | 2 |

SYNTHETIC INPUT AND TARGET FEATURES

FIG. 6

| FEATURES | LABELING APPROACH | | TARGETS | v2 + LSE | | | |
| --- | --- | --- | --- | --- | --- | --- | --- |
| | | | | DAILY WAW (HAPPINESS) | | | |
| | SENSORS | TARGET | | PRECISION (MACRO) | RECALL (MACRO) | F1 SCORE (MACRO) | CONFUSION MATRIX |
| PASSIVE + ACTIVE + ONBOARDING | 3 std from mean | 3 std from mean | NORMAL VS SAD | 0.48 | 0.45 | 0.44 | [[148 51] [11 2]] |
| | 2 std from mean | 2 std from mean | NORMAL VS SAD | 0.50 | 0.49 | 0.43 | [[1075 646] [90 50]] |
| | 30 percentile | 30 percentile | NORMAL VS SAD | 0.65 | 0.60 | 0.58 | [[28 56] [13 88]] |
| | 20 percentile | 20 percentile | NORMAL VS SAD | 0.75 | 0.60 | 0.60 | [[141 5] [46 14]] |
| | 10 percentile | 30 percentile | NORMAL VS SAD | 0.71 | 0.63 | 0.61 | [[28 56] [7 94]] |
| | 10 percentile | 10 percentile | NORMAL VS SAD | 0.79 | 0.62 | 0.65 | [[162 4] [30 12]] |

FIG. 7

LABELING APPROACHES AND FEATURES FOR CHARACTERIZING HAPPINESS

| LABELING SENSORS | LABELING TARGET | TARGET | NUMBER OF INSTANCES PER CLASS 0 (LOW) | NUMBER OF INSTANCES PER CLASS 1 (HIGH) | NUMBER OF INSTANCES PER CLASS 2 (NORMAL) | INPUT FEATURES | CONFUSION MATRIX | PRECISION | RECALL | F1-SCORE | AUC |
|---|---|---|---|---|---|---|---|---|---|---|---|
| 10% | 10% | Anxiety_today_all | 1060 | 524 | 536 | SENSORS | [[392 59] [96 352]] | 0.83 | 0.83 | 0.83 | 0.83 |
| 10% | 10% | Anxiety_today_ind | 189 | 174 | NA | SENSORS + ACTIVITY, COMPANY, THINKING | [[128 61] [57 117]] | 0.67 | 0.67 | 0.67 | 0.67 |
| 30% | 20% | Anxiety_today_ind | 321 | 352 | NA | SENSORS | [[191 130] [124 228]] | 0.62 | 0.62 | 0.62 | 0.62 |
| 20% | 30% | Anxiety_today_ind | 549 | 562 | NA | SENSORS + ACTIVITY, COMPANY, THINKING | [[334 215] [226 336]] | 0.60 | 0.60 | 0.60 | 0.60 |
| 10% | 20% | Anxiety_today_ind | 321 | 352 | NA | ACTIVITY, COMPANY, THINKING | [[109 212] [56 296]] | 0.62 | 0.59 | 0.57 | 0.59 |

LABELING APPROACHES AND FEATURES FOR CHARACTERIZING ANXIETY

FIG. 8

DETECTING A USER'S OUTLIER DAYS USING DATA SENSED BY THE USER'S ELECTRONIC DEVICES

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2020/087426, filed on Dec. 21, 2020, and published as WO 2021/123421 A1 on Jun. 24, 2021, which in turn claims priority from European Application No. EP 19383169.0, filed in the European Patent Office on Dec. 20, 2019. This application is a continuation-in-part of International Application No. PCT/EP2020/087426, which is a continuation of European Application No. EP 19383169.0. International Application No. PCT/EP2020/087426 is pending as of the filing date of this application, and the United States is an elected state in International Application No. PCT/EP2020/087426. This application claims the benefit under 35 U.S.C. § 119 from European Application No. EP 19383169.0. The disclosure of each of the foregoing documents is incorporated herein by reference.

TECHNICAL FIELD

The present invention has its application within the telecommunications sector and, more specifically, relates to the deployment of tools using electronic devices and communication electronic devices (e.g., computers, PCs, mobile user terminals such as smartphones, tablets, wearable electronic devices, etc.) that monitor and send user parameters and/or interact with the user to detect good or bad irregular (exceptional) days. More particularly, the present invention relates to a method and electronic system for an efficient measurement, modeling and detection of a user's irregular days, which allows accurate recommendations to be derived.

BACKGROUND

An accurate mechanism for detecting a user's irregular days (also referred to as outlier days) in the user's life would be useful as it would allow positive and negative drivers associated with those days to be inferred and recommendations to be derived. By accurately detecting positive and negative outlier days and what drives those days to be exceptionally good or bad, it would be possible to generate a list of personalized effective recommendations, such as device use behavior recommendations or health recommendations, among others.

However, it is not easy to identify something as an outlier or not because in most cases that depends on several factors, such as the type of data under analysis, its value and distribution, the specific behavior of the user, etc. Actually, none of the prior art solutions perform an accurate detection of these irregular days.

For example, US 2012/0130196 discloses a method for receiving and recording inputs identifying a mood of a person, a mood intensity level of the mood, an activity of the person coinciding with the mood, and the time of the mood. Or U.S. Pat. No. 6,539,249 discloses a method that assesses the status of the wellbeing of patients being treated for congestive heart failure (CHF) using cardiac pacing as a therapy. By sampling the output from an activity sensor or the like, and by noting the frequency with which the averaged rectified sensor output exceeds a pre-set threshold following changes in the pacing mode, the efficacy of the new mode compared to the previous one can be evaluated.

These and all the existing solutions use raw values of the user's data and thus produce models that are hard to be transferred to different solutions due to the variability in the type of sensors. Moreover, the existing state of the art uses only labeling approaches on the target feature for labeling outlier days and typically trains the model using the raw values of the features. Moreover, none of the prior art approaches explore the optimal labeling approach for reaching the best results for detecting outlier days.

A need therefore exists for a method and system for detecting a user's outlier days in an accurate, personalized and resources saving way, allowing accurate recommendations to be derived.

SUMMARY

A novel method for efficiently detecting a user's irregular days (exceptionally good or bad days) is based on positive and negative drivers associated with those irregular days. The method detects positive and negative outlier days by determining what drives those days to be exceptionally good or bad. Then the method generates a list of personalized recommendations to achieve good days.

The novel method for detecting a user's outlier days labels features by training a machine learning classification model. Data corresponding to each of a plurality of features related to the user is acquired over a plurality of days by sensors on an electronic device of the user. The data acquired on each of the plurality of days and for each of the plurality of features is labeled as being regular or irregular by applying N labeling approaches, where N is a positive integer greater than one. At least one of the N labeling approaches involves comparing the data corresponding to each of the plurality of features with how values of previously acquired data for corresponding features is distributed. N labels are generated for the data corresponding to each of the plurality of features for each of the plurality of days. The machine learning classification model is trained using one of the N labels for each of the N labeling approaches. An optimal labeling approach is selected from among the N labeling approaches for each of the plurality of features using the machine learning classification model. For each of the plurality of features, the method determines whether each of the plurality of days is an outlier day for the user using the labels obtained with the optimal labeling approach.

Examples of the features include: a usage pattern of the electronic device by the user, location data indicative of the location of the user, environmental data related to the location of the user, physiological data of the user, and behavioral data of the user. Examples of the location data include: indoor temperature, indoor light level, light exposure, and noise level. Examples of the environmental data include: pollution level, outdoor light level, humidity, and outdoor temperature. Examples of the physiological data include: galvanic skin response, heart rate variability, and skin temperature. Examples of the behavioral data include: mobility, social interactions, and sleep state.

A novel system for detecting a user's outlier days includes a receiver and a processor. The receiver receives data through a communications network from an electronic device of the user. The data corresponds to each of a plurality of features related to the user. The data is acquired over a plurality of days by sensors on the electronic device of the user. A computer include the processor. The processor is configured to label the data acquired on each of the plurality of days for each of the plurality of features as being regular or irregular by applying N labeling approaches. At least one of the N labeling approaches involves comparing the data corresponding to each of the plurality of features with how values of previously acquired data for corresponding features are distributed The processor is also configured to generate N labels for the data corresponding to each of the plurality of features for each of the plurality of days. The processor is also configured to train a machine learning classification model using one of the N labels for each of the N labeling approaches. The processor is also configured to select from among the N labeling approaches an optimal labeling approach for each of the plurality of features using the machine learning classification model. Finally, the processor is configured to determine for each of the plurality of features, using the labels obtained with the optimal labeling approach, whether each of the plurality of days is a good outlier day or a bad outlier day for the user. The system then generates a list of personalized recommendations for the user to achieve good days.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

FIG. 5 is a table of data values of input features and the corresponding level of the target feature happiness derived from the input features.

FIG. 6 is a table of synthetic feature values and the corresponding synthetic target feature.

FIG. 7 is a table of labeling approaches and features for characterizing a user's happiness on a particular day.

FIG. 8 is a table of labeling approaches and features for characterizing a user's anxiety on a particular day.

DETAILED DESCRIPTION

Figure 1:
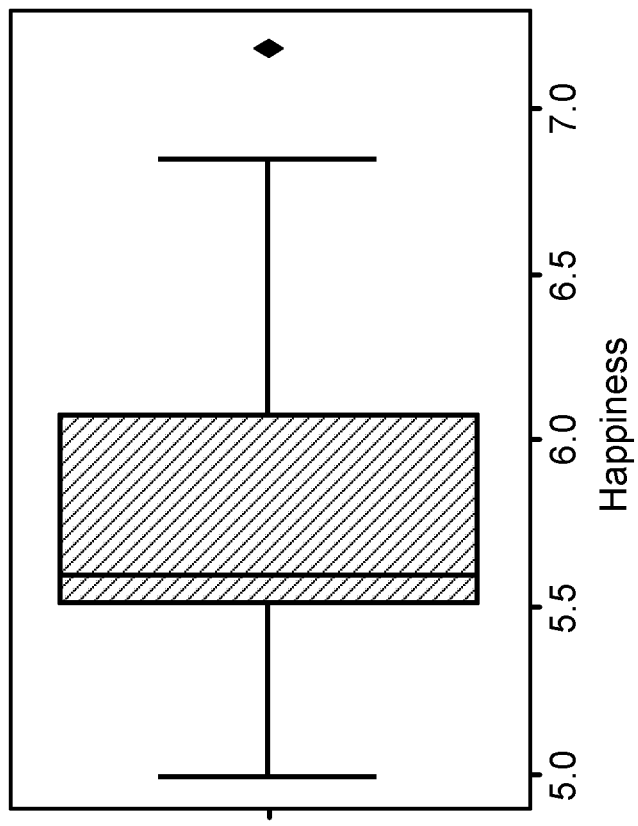
FIG. 1 shows a schematic graphic showing the distribution (left figure) and box plot (right figure) of a target feature (happiness) depicting positive outlier days for an individual.
Figure 1:
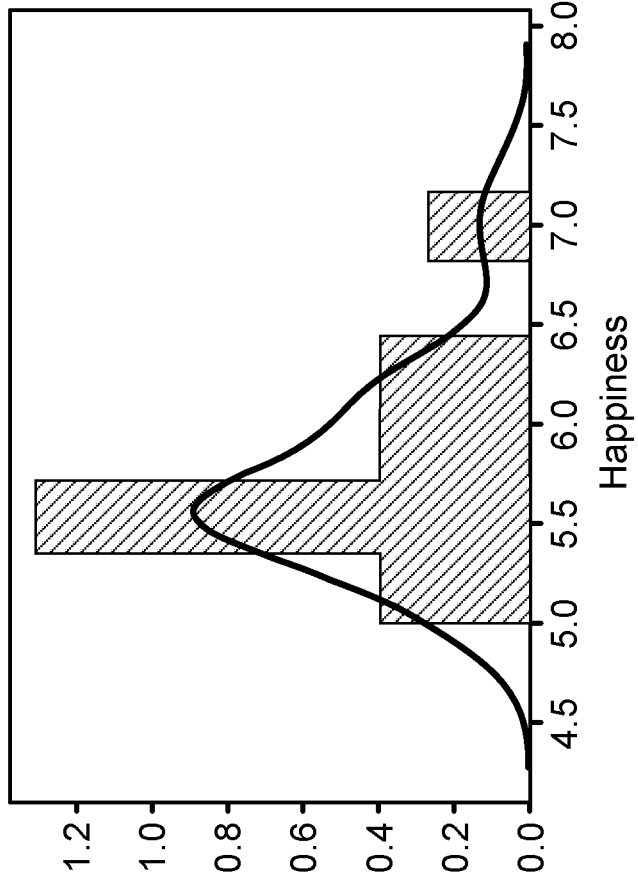

Reference will now be made in detail to some embodiments of the invention, examples of which are illustrated in the accompanying drawings.

The disclosed embodiments provide a method and system for efficiently detecting a user's irregular days, for example, from the user's wellbeing point of view or from any physical aspect that may affect the user's life. The method infers positive and negative drivers associated with those irregular days (exceptionally good or bad days, also referred to as outlier days). The method involves user data collection, outlier analysis, outlier detection, positive and negative drivers detection and deriving recommendations. The disclosed embodiments allow positive and negative outlier days, as well as what drives those days to be exceptionally good or bad, to be detected. The method then generates a list of personalized recommendations. The outlier analysis is based on the recognition that during an irregular day, the usage patterns of the user's electronic devices (phone, laptop, PC, tablet, TV or any other type of electronic device) will be irregular as well. Moving away from raw data from sensors, the method builds synthetic input features based on labeling the sensor measured data as regular or irregular for each day. These synthetic features represent encodings for regular or irregular behavior. Nevertheless, one of the main challenges remains how to label something as an outlier or not, as in many cases this depends on the dataset being analyzed, considering its distribution and other properties.

The disclosed embodiments tackle this through an explorative search. Given a target-labeled dataset where past measurements (for example of wellbeing) are measured, the method infers and applies the most suitable labeling approach and builds synthetic input and target features accordingly to optimize for the best results in terms of detecting irregular days. The target features are the user features (typically features related to user wellbeing, for example, happiness, anxiety, health state) that are estimated from the input user features.

Using those synthetic features instead, the method trains a machine learning model that predicts whether the user is having an irregular day, such as an exceptionally good or bad day. Furthermore, the system extracts the drivers of those behaviors to guide future personalized interventions. The system can be applied to a range of services to improve the user's life, for example, the user's wellbeing.

The disclosed embodiments have several applications. For example, the occurrences when a user is having a worse day than normal and might benefit from an intervention to improve his/her life (for example, his/her wellbeing) can be identified and anticipated. The method allows the personal drivers for that user to be identified based on the outlier goods days such that the drivers can drive more personalized interventions. Specifically, those factors that influence good and bad days can be discovered. The activities that users performed during good and bad days serve as guidelines for the interventions, as good/bad drivers for the users' behavior can be identified and personalized for each user. Personalization is an important aspect because the disclosed embodiments analyze outlier days for each user considering his/her own patterns of behavior as well as compared to the entire population, including for deriving wellbeing and drivers for those good/bad days. Moreover, the system does not rely on raw data values, which enables it to be ported to different applications with only minor adjustments.

In a first aspect, a computer implemented method efficiently detects outlier days of a user belonging to a group of users. The method includes the following steps performed by one or more electronic devices.

a) An electronic device receives (e.g., through a telecommunications network) datasets of one or more features related to the user and/or to the group of users corresponding to one or more days under analysis, where at least one of said datasets has been acquired by one or more electronic devices. These electronic devices are user electronic devices, such as laptops, tablets, personal computers, wearable devices, portable computers, mobile phones, smartwatches, smartphones and sensors usually located in the user electronic devices.

b) The dataset of each feature is labeled as regular or irregular for each day applying N labeling approaches, N>1, obtaining N labels (one per labeling approach) for each dataset (for each feature), where at least one of the labeling approaches includes comparing the dataset of each feature with the distribution of values of previously obtained datasets for each feature for the user or for the group of users;

c) For each labeling approach of the N labeling approaches of step b), the obtained labels are used to train one or more machine learning (artificial intelligence) classification models (e.g. classification algorithms);

d) Based at least on the results of the one or more machine learning classification models (preferably the model with the best results is used here if more than one machine learning model is used in step c)), an optimal labeling approach is selected from the N labeling approaches (e.g., the labeling approach that achieves the best results in terms of model performance parameters); the selection can be made for each feature, so depending on the feature, the optimal labeling approach selected may differ;

e) At least based on the labels obtained with the optimal labeling approach for each feature, the method determines whether the one or more days under analysis are outlier days for the user. In one embodiment, this step further involves determining whether a day determined as an outlier day is a positive or a negative outlier day.

The one or more features of step a) may include one or more of the input features: usage patterns of the use of user electronic devices by the user and/or by the users of the group or users, ambient data related to the location of the user or of the users of the group of users, environmental data related to the location of the user or of the users of the group of users, physiological data of the body of the user or of each user of the group of users and/or behavioral data of the user or of the users of the group of users. The environmental data may be values of at least one of the following parameters: pollution, outdoor light level, indoor light level, weather, humidity, and outdoor temperature. The behavioral data may be values of at least one of the following parameters: mobility, social interactions and sleep state. The physiological data may be values of at least one of the following parameters of the body: galvanic skin response, heart rate variability, and skin temperature. The ambient data may be values of at least one of the following parameters: indoor temperature, indoor light level, light exposure, and noise level.

In one embodiment, a labeling approach involves comparing each dataset with the i and/or 100-i percentile of the values distribution of previously obtained datasets for the feature for the user or for the group of users, where i is a design parameter.

In another embodiment, a labeling approach involves comparing each dataset with the mean or median of the distribution of values of previously obtained datasets for the feature for the user or for the group of users.

In another embodiment, a labeling approach involves comparing each dataset with the variance of the distribution of values of previously obtained datasets for the feature for the user or for the group of users. The one or more features of step a) may also include at least one wellbeing feature (target feature) of the user or group of users estimated from one or more of the receiving datasets measured by one or more electronic devices (input features).

The method further includes determining the relevancy of the features whose data is received in step a) for the determination that a day is a positive or negative outlier day made in step e); and deriving user recommendations to improve his/her wellbeing based on the determined relevancy for each received feature, where the recommendations may be sent to a user's electronic device through a telecommunications network.

The method may be performed by a user electronic device (or more than one, interacting between them), or it may be performed in a remote electronic device (a server). The one or more user electronic devices that acquire the datasets of features related to the user or to the group of users send the acquired data to the server through a communications network.

In another embodiment, the datasets are acquired using at least one of the following electronic devices: usage logs or sensors embedded in a user communications device, wearable electronic devices with sensors to measure body signals, presence sensors, location sensors, smart environments devices, bed sensors, environment sensors to monitor environment parameters such as temperature, air quality or weather information.

In one embodiment, before step b) the datasets are pre-processed using one or more data pre-processing techniques.

In one embodiment, the acquisition of at least one of the datasets in step a) includes: periodically presenting to the user or to each user of the group, through the user interface of one or more user electronic devices, a questionnaire previously received in the user electronic device(s), and receiving, through the user interface of the user electronic device, answers to the questionnaire from the user or from each user of the group. In a second aspect, an electronic system performs any of the above stated methods. For example, an electronic system for efficiently detecting outlier days of a user belonging to a group of users includes:

Communication means for receiving, through one or more communications networks, datasets of one or more features related to the user and/or to the group of users corresponding to one or more days under analysis, where at least one of the datasets has been acquired by one or more electronic devices;

Processing means configured to label the dataset of each feature as regular or irregular for each day applying N labeling approaches where N>1, obtaining therefrom N labels for each dataset for each feature, where at least one of the labeling approaches involves comparing the dataset of each feature with the distribution of values of previously obtained datasets for the feature for the user or group of users. For each labeling approach, the obtained labels are used to train one or more machine learning classification models. Based at least on the results of the one or more of the machine learning classification models, an optimal labeling approach is selected from the N labeling approaches for the features. Based at least on the labels obtained with the optimal labeling approach for the datasets, the processing means determines whether the one or more days under analysis is an outlier day for the user.

In yet another aspect of the present invention, a computer program includes computer program code means adapted to perform the steps of the novel methods. The program is run on processing means, for example a computer, a digital signal processor, a field-programmable gate array (FPGA), an application-specific integrated circuit (ASIC), a microprocessor, a micro-controller, or any other form of programmable hardware. In other words, a computer program includes instructions that cause a computer executing the program to perform all of the steps of the novel method when the program is run on a computer. A digital data storage medium is also provided that stores the computer program, which includes instructions that cause a computer executing the program to perform all steps of the novel methods when the program is run on a computer.

The embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

The disclosed embodiments provide a method and system for efficiently and accurately detecting irregular days (also referred to as outlier days) of an individual (referred to generically as a user). The novel method and system accurately selects the optimal labeling approach for a given dataset for applying anomaly detection and detecting the outlier days for the individual.

The data on which the detection is based can be any data (any feature) related to the user and/or to a group of users. Each type of data is called a feature. The data can be obtained by any type of electronic sensor or electronic device. From the electronic sensors or electronic devices that measure the data, the data is sent (for example, through any telecommunications network) to the electronic devices that perform the novel method. In one embodiment, the data is obtained from the users' electronic devices (phone, laptop, PC, tablet, TV, smartwatch, or any other type of electronic device). For example, the acquired data includes usage patterns of the electronic devices by the user and/or group of users.

The group of users whose data is used can be any group of users to which the user may be classified or may have something in common. For example, users classified together include those using the same service, users to whom the wellbeing is also being estimated, users from the same location (city, neighborhood) as the user, users with the same professional activity as the user, or any combination of these.

The data monitored and used by the novel system are captured from one or more sources of data using one or more electronic devices that obtain the data values of the parameters, for example in the following ways:

- A communications device (the user's communications device or user's device) is used to ask questions of the user (e.g., in the form of a survey or a questionnaire) and to receive direct user inputs (e.g., answers to the questions asked of the user). The users' communications device may be any electronic communication device, such as a laptop, a tablet, a personal computer, a portable computer, a mobile phone, a smart phone, any personal communications device or, generally speaking, any electronic communications device. The user's communications device must have a user interface (for example, a screen, a keyboard, a speaker, a microphone) in order to be able to asks the questions of the user and to receive his/her answers.
- Data is acquired using usage logs or sensors embedded in personal devices (for example hand held devices), such as wearable devices, hand-held devices as mobile phones, smart phones, tablets, laptops and smartwatches. The personal device may be the user's communications device configured to ask questions and receive inputs from the user or a different device. The user's communication device (for example, his/her mobile phone) can also be used to monitor other parameters besides direct user inputs, such as body signals of the user as heart rate, ambient parameters as light level, environmental factors, and behavior parameters as social interactions.
- Data is acquired using dedicated body sensors to measure body signals. The dedicated body sensors may be included in wearable electronic devices, such as smartwatches, bracelets (e.g., fitbit, jawbone), clips (e.g., fitbit) or any other type of wearable electronic devices that can be worn by the user.
- Data is acquired from ambient (indoor) sensors, such as motion and presence sensors, location sensors, smart environments devices, bed sensors, etc.
- Data is acquired from environment (outdoor) sensors that monitor environmental parameters, such as temperature, air quality, weather information and any other environmental parameters.
- Data is obtained from external sources, such as dedicated databases, news, social networks, etc.
- Generally speaking, any known electronic device can be used to obtain the data values of the parameters used by the system. Even a single electronic device can be used to obtain the data values of multiple types of parameters. For example, a wearable device can be used to obtain body signals as well as environmental parameters. Or a mobile phone can be used to obtain direct inputs from the user as well as body signals, ambient parameters, environmental parameters, and behavior parameters from sensors on the mobile phone.

All of this data captured and collected over a certain period of time, such as a week, a month or a year, is stored. All of the parameter values obtained by the different electronic devices are sent by the electronic devices to a database. The database may be internal to one of the electronic devices (for example, the user's communications device) or may be external to all the electronic devices used to obtain the data (for example, in a remote server). The electronic devices used to obtain this longitudinal data have a communication interface that allows the electronic devices to communicate the acquired data to the database (directly or through another electronic device) over a communications network. The communications network may be a wireless communications network, a mobile communications network such as GSM 2G, GPRS, UMTS, 3G, 4G or LTE, LAN or W-LAN or any other type of wired or wireless communication networks.

Three cases of irregular behavior are considered when detecting irregular days:

Irregular days (irregular behavior) are determined by considering the normal behavioral patterns of the user. The irregular days are defined with respect to the normal distribution of data values of the individual. For example, when the user generally has a good or bad day due to disturbances in the user's daily activities, the user's typical (subjective) wellbeing score for that day is impacted. For instance, a work day that exceeds 10 hours due to a stressful deadline can result in a poor score for subjective wellbeing for that day. Irregular days are determined by considering the normal behavioral patterns of the population or generally speaking a group of users. The irregular days are defined with respect to the normal distribution of data values of the population/group. For example, the system determines when the user is having a good or a bad day compared to the distribution of values of the entire population/group. Here the population considered may be a significant number of individuals in order for the data to be representative.

Deviant individuals. The system also considers when the user has good or bad days in general, independently to the distribution of values for the entire population. A deviant individual most likely exhibits good or bad habits. For example, a user suffering from chronic stress typically would have poor daily happiness scores and high stress/anxiety scores independent of the data from the population.

FIG. 1 shows the values of a distribution plot (left figure) and box plot (right figure) representing happiness/wellbeing for an individual in an example (without limitation purposes). The distribution plot is a histogram, where each bar represents how often each value of the x-axis is found in the individual's distribution. The box plot depicts groups of numerical data (in this case, happiness score) through their quartiles (with lines extending vertically from the boxes indicating variability outside the upper and lower quartiles, while the dots represent outliers. So the box pot similarly shows in a box where the values of the happiness levels concentrate. In this case, the box itself represents the values from the 25-75 percentiles.

FIG. 1 illustrates that the individual will have most days within certain normal values, but some days will be outliers. For the individual represented in FIG. 1, most days are scored with a happiness of 5.5 (see left figure), while the line in the box plot (see right figure) shows that the mean value is somewhat above 5.5. However, both figures show that this individual had an irregular positive day with a score of 7. If the user would have scored 5 or less, it would have been an irregular negative day. These days are irregular compared to his/her distribution of values in the past. The novel method allows these irregular days of an individual to be efficiently detected based on outliers in data that is acquired passively (without user interaction) from sensors, for example, on the user's electronic device, phone or wearable device. The method utilizes outliers in monitored features (monitored user's data) only as an input. In this way, many of the prior art limitations are bypassed, and a more generic solution can be developed to detect positive and negative outlier days.

Figure 2:
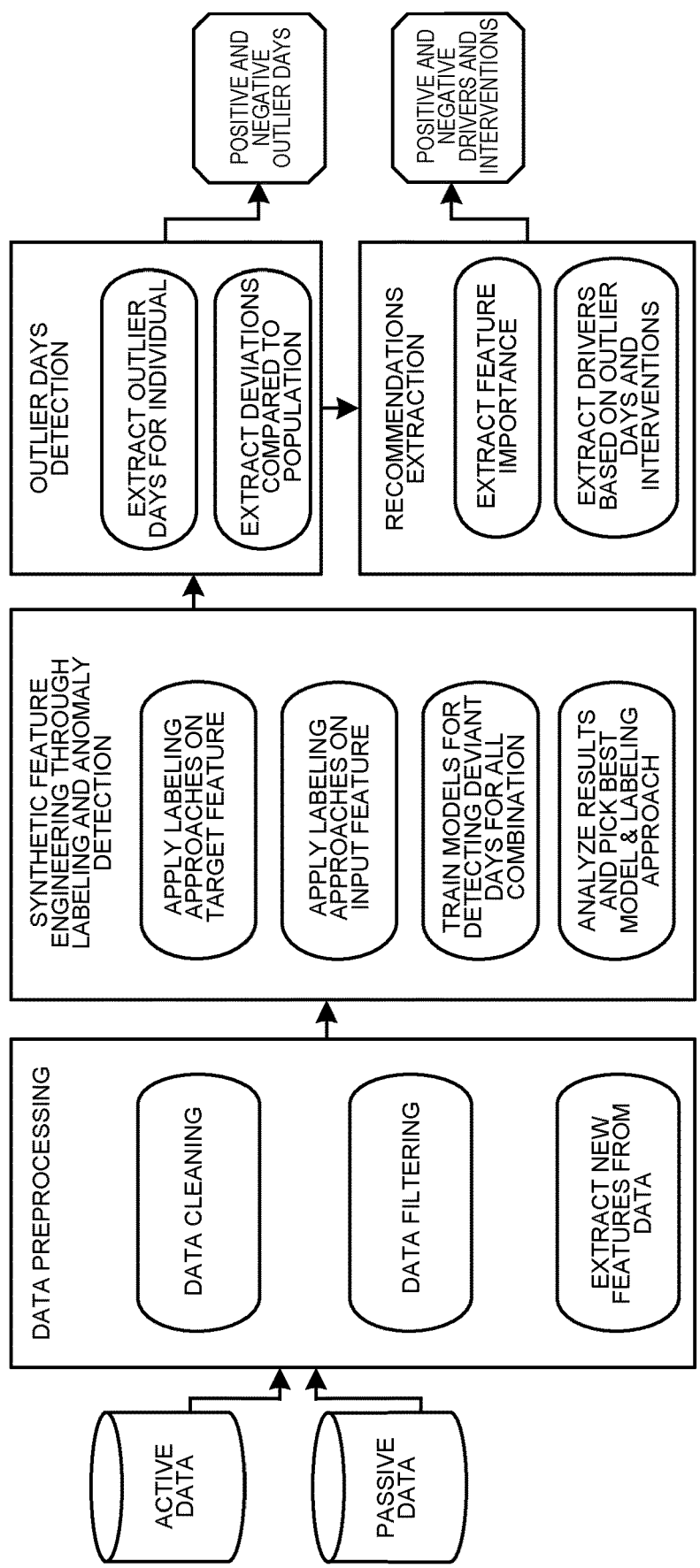
FIG. 2 shows a schematic block diagram of the system architecture according to an embodiment of the present invention.

FIG. 2 shows the main blocks (functional elements) of a system for accurately detecting irregular days of a user, in other words for optimally labeling the user's days as being irregular days or regular days. Although the functional elements are shown in FIG. 2 as isolated blocks for simplicity and clarity, the function of each block can be performed by the same hardware devices (e.g., the same processor/device) or by different devices (e.g., different electronic processors/devices communicated by any communications network. FIG. 2 shows just one embodiment. Not all of the blocks (functional elements) shown in FIG. 2 are required for performing the irregular days detection.

In one embodiment, the main blocks include:

Functional block for data pre-processing: The detection of a user's irregular days is based on user data (user features) from a particular user and/or group of users, preferably a group to which the particular user belongs. This data is obtained from and measured by sensors on user electronic devices (for example, usage patterns of the users' electronic devices) and is sent (for example, through any type of communications network) to the electronic device performing the data pre-processing. The user data that is pre-processed can be active or passive data.

Active data is data queried from the user, usually through an electronic device. For example, the user can be asked how anxious he/she feels today.

Passive data represents data that is collected passively and transparently to the user, without the user having to take any action, by the user electronic device (phone, wearable device). For example, location data is acquired by the location sensor of the phone, and the user does not need to input the user's location manually at each point of time. Rather, the user need only consent to the location being collected passively.

In the data pre-processing block, techniques are applied such as data cleaning and filtering and data imputation. Also new but common features can be extracted from raw data, such as extracting the number of steps from accelerometer data.

Functional block for labeling and anomaly detection through synthetic features engineering: In this functional block, input and target synthetic features (not raw data) are built by applying different labeling approaches. These synthetic features are based on labeling the measured data (from the sensor and/or the electronic devise) as regular or irregular for each day. Additionally, the target feature can be set as a future days' values of wellbeing (e.g., anxiety tomorrow, in two weeks, etc.).

How the synthetic input and target features are obtained is now explained in more detail using a specific example. The input features are the features related to the user and/or to a group of users, obtained from electronic sensors or, generally speaking, electronic devices. The input features are physical, physiological, environmental, and usage patterns of electronic devices. The target features are the user features (for example, psychological user features or wellbeing features) that are to be estimated from the input user features (for example, happiness, anxiety and health state).

For example, in one aspect user happiness is predicted from electronic sensors data. In this case, the input features are the various physiological features related to the user that are directly obtained from sensor data (e.g., user steps count obtained from a pedometer, ambient light level obtained from a light sensor). In one example, the input features are the battery level of the user's mobile phone, the ambient light level, the step count and the noise level. From these input features, the happiness level (target feature) is derived. From these input and target features, synthetic features are derived that represent whether the input and target features were abnormal during the day on which the sensor data was acquired based on the distribution of the input and target features during other days. The distribution of the input and target features taken into account to derive the synthetic features can only consider the patterns of the specific individual over time and/or the patterns of the group of users (population).

For example, a synthetic input feature is defined as the ambient light level being abnormal during the day on which the sensor data was acquired considering the distribution of the light level in general. Similarly, a synthetic target feature can be whether the user had an irregularly happy day on that day. The values of these features can be a binary value (0,1) or even in between, if percentiles are considered. For example, the table of FIG. 5 lists the values of the input features (according to this example) measured by the sensors on different days (for example, the average or the top value for the particular date) and the estimated value of the target feature happiness derived from the input features using one of several possible algorithms.

From the raw data of FIG. 5, the system derives the synthetic input and target features listed in the table of FIG. 6. In this example, sensor data values that are irregularly low are marked as 0, and sensor data values that are irregularly high are marked as 1. Normal is marked as 2. In another embodiment, the normal rows can be removed for training. In the example of FIG. 6, it has been considered that the normal sensor data values of battery level and light level are between 25 and 75, for noise level between 20 and 50 dBs, for step count between 500 and 2000, and for happiness between 3 and 7.

These synthetic feature values are input for training the machine learning models to predict the irregular days.

Based on the derived synthetic features, machine learning models are trained to detect abnormal (deviant) days. The optimal model and labeling technique is selected for the dataset under analysis.

Functional block for outlier days detection: Here the selected machine learning model is applied on individual sets of data values either based on the distribution of the values (more anomalies expected) and/or based on the population distribution (less anomalies expected) depending on the use case. The synthetic features that are obtained with the optimal labeling technique for each day under analysis are compared to the usual values for the individual and/or group (the population), and from these comparisons the outlier days are detected. These usual (normal) values are obtained from the previous data obtained for the user and from the group in previous days (preferably no-irregular days). The output of this functional block is which of the days are outliers with a further indication of whether it is a positive or negative outlier.

Functional block for recommendations extraction: Based on past detected outlier days, the importance of each feature (input features or target features) is determined. The system determines which features are most relevant (more important) for the determination that a day is a positive or negative outlier day. Whether one or more specific features, such as the number of steps per day or the number of calls per day, is important for predicting whether or not the day is a positive or negative outlier for the user is determined using the selected machine learning model.

Then, both positive and negative drivers (recommendations) are extracted, either based on the input features that have been determined as relevant for a specific user or based on the entire population (deviant individuals). The drivers are causal drivers or correlation factors to the target features and the irregular days. For example, the drivers correlate to the wellbeing/anxiety of the user or to any other user physiological or psychological feature/symptom.

Then, the system identifies which drivers are relevant based on user input features. For example, in the example of FIGS. 5-6, the system determines that a high noise level is linked to a specific user's low level of wellbeing. In this case, low noise activities will be recommended to the user, or the user will be informed about these correlations/drivers between the level of noise and the low wellbeing.

In addition, driver correlations can be identified based not only on the individual user, but also on the entire population (group of users), for example on the low level days or high level days of the group or of deviant individuals in the group. Deviant individuals are individuals who always score very high or very low in the target feature, such as the anxiousness level or happiness. The system determines the values of the target features for the deviant individuals (or in other words, determines what these individuals do). The system determines which features a user should be recommended to avoid based on a correlation with deviant individuals who score very low in the target feature or have many negative irregular days. The system also determines which features the user is recommended to undertake based on a correlation with deviant individuals who score very high in the target feature or have many positive irregular days. For example, the system recommends or advises against features based on which locations the user frequents, the user's phone usage pattern, the light level or noise level experienced by the user.

In one embodiment, the results of the system are made available (for example displayed or stored in an electronic device) to the user or to the clinician analyzing the user's behavior. The displayed results can be the positive and negative drivers, the effectiveness of prior drivers applied to the user (prior interventions), various alerts (for example, when an irregular day is detected or when the number of irregular days detected is above a threshold), history charts, or any other data derived from the results of the system that are useful to the user or to the clinician.

Figure 3:
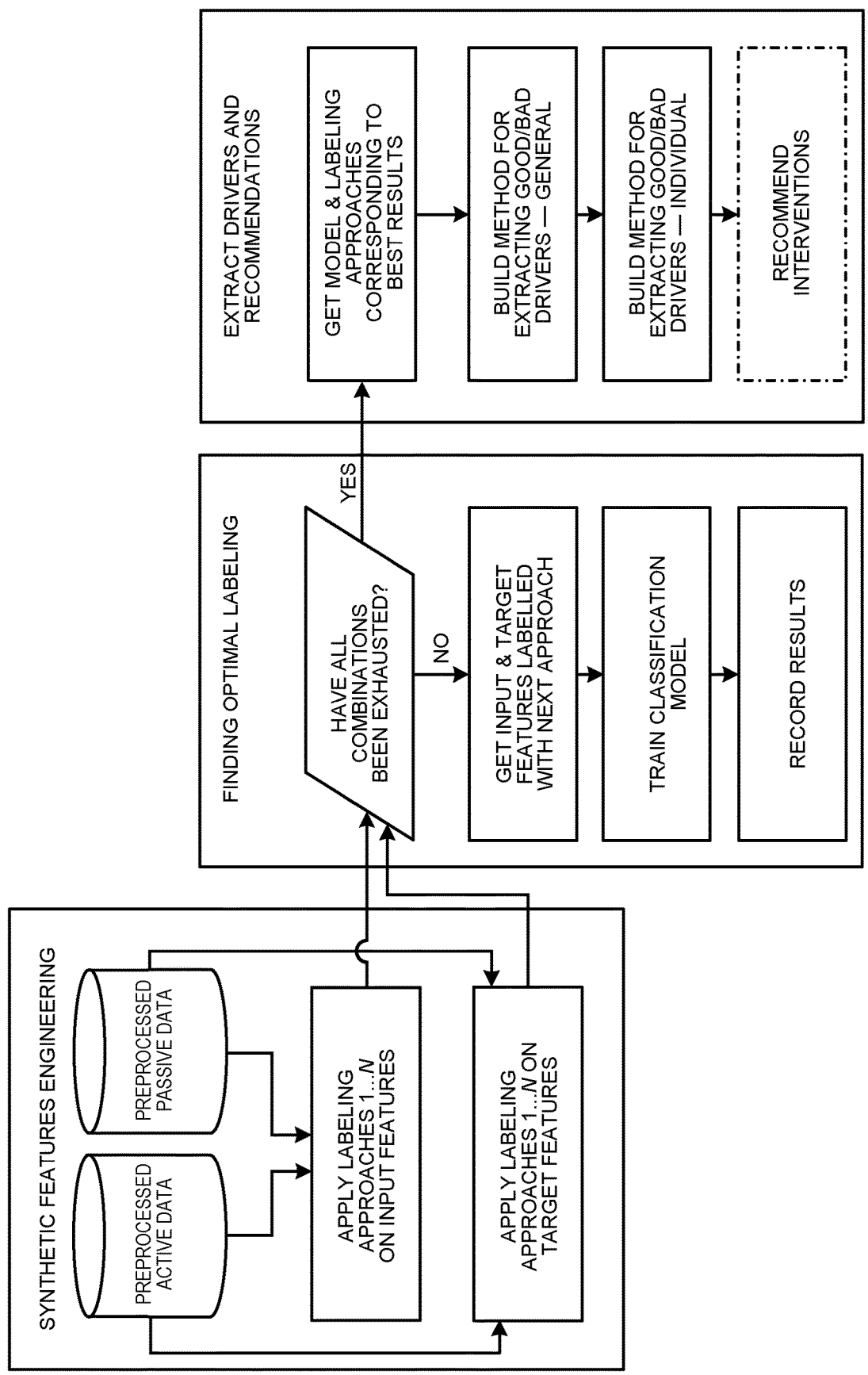
FIG. 3 shows a flow diagram of the proposed solution according to an embodiment of the invention.

The operation of the novel system is now explained in more detail in relation to one embodiment. FIG. 3 is a flow diagram schematically showing steps of a novel method implemented by the system.

1. Step of engineering synthetic features: The active and passive user data from the particular user or group of users acquired from sensors and user electronic devices is pre-processed, such as by filtering and data cleaning. Given a pre-processed dataset (input data), several labeling approaches are applied to the source features (input features) and then to the target feature in order to build the training dataset. In one embodiment, multiple prior values from past days are also used as input features. Generally, N (N>1) labeling approaches are applied to each dataset of each feature so as to obtain N labels (synthetic features), one per labeling approach used for each dataset, where N is a design parameter. An example of the labeling approaches that can be applied to obtain the synthetic input and target features is described below.

Labeling approaches 1-3: For each feature, data whose values under the i and 100-i percentile of the distribution of values that are used for comparison are labeled as negative or positive outliers, respectively, where i is a design parameter. Typically $i \in \{10,20,30\}$ applies for approaches 1, 2 and 3, respectively. But other values of i are possible. Depending on where the data being analyzed belongs in the distribution of values for the corresponding feature used as a basis for comparison, the dataset for a day is labeled as positive or negative. The distribution of values used for the comparison can be, for example, the data values for the feature from other (usually past) days for the specific user or the distribution of data values from the group of users (for the same day or from different days).

Labeling approach 4-6: For each feature, data whose value belongs to more than j standard deviations from the mean or median of the distribution of values used for comparison (i.e., mean/median$\pm j*\sigma$, where $\sigma$ is the standard deviation) are labeled as negative or positive outliers depending on their positioning, where j is a design parameter and typically $j \in \{1,2,3\}$ for approaches 4, 5 and 6, respectively. But other values of j are possible. The distribution of values used for the comparison can be, for example, the data values for the feature from other (usually past) days of the specific user or the distribution of data values from the group of users (for the same day or from different days).

Labeling approach 7 using an absolute threshold. Fixed: For a value [l,h], a fixed threshold can be applied as t such that data whose values are within [l,l+t] and [h−t,h] are labeled as negative or positive outliers, respectively. The factor t is a design parameter. Variable:

Considering the variance of values for each user and the fact that users can characterize their days very differently, a threshold is computed as a function of the variable and is used to label certain data as negative or positive outliers in order to allow for a variable rather than fixed thresholding approach.

The method employs the novel approach of using percentiles and statistic values instead of absolute values when extracting features (i.e., parameters) that are used as an input into the models. The typical approaches of using absolute values (e.g., daily mean of heart-rate, hours slept, daily time at home/work, daily time with friends, daily ambient temperature, etc.) as input parameters, do not capture individual differences well. For example, an outlier for a first user might correspond to the mean value for a second user. Therefore, the method more accurately differentiates between user using less captured data (so resources are saved) by using percentiles and statistical values instead of absolute values.

The dataset (distribution of values) considered for this labeling approach may belong either to a) a single user or b) an entire population (group of users). The dataset belonging to a single user is used to detect outlier days and personalized interventions for the user. The dataset belonging to a group of users is used to detect individuals who always have outlier days compared to the entire population and to extract general good or bad drivers that could be applicable to other individuals 2. Step of finding optimal labeling. An optimal labeling approach for each source and target feature is found by using the outlier labeled features in the following substeps. Note the labeling approach can be different depending on the individual user in the sample population.

a. Use synthetic input and target features labeled by one of the labeling approaches from step 1. As an alternative, a brute-force approach can be tried where all labeling approaches are applied on the input features, and the labeling approaches are used in an ensemble to automatically learn the optimal labeling approach.

b. Train a machine learning classification model with the data labeled using this approach (that is, the obtained synthetic features) with a grid-search for optimizing the parameters. The models are created by supervised machine learning classification algorithms, such as Bayesian Networks, Linear Regression, Support Vector Machines, Decision Trees (e.g., XGBOOST, Random Forests), Hidden Markov Models or any other algorithm. The model can be tuned to balance precision. In the preferred embodiments, the model is trained using XGBoost, due to its flexibility and general performance, or logistic regression.

c. Record the results of the machine learning model for the synthetic features obtained using the selected labeling approach.

d. Repeat a-c for a different labeling approach (or combination of labeling approaches) until all results from the labeling approaches are recorded.

e. For each feature, select the optimal labeling approach. The optimal labeling approach may be the approach, and consequently the corresponding synthetic feature, that reached the best results in terms of model performance (e.g., f1-score, precision, recall, AUC), that is, in terms of machine learning performance. For this selection, the accuracy of the labeling approaches for previously detected irregular days detection is taken into account.

3. Step of determining outlier days and drivers for those days. Once the machine learning model and labeling approach the provide the best results are selected, the positive and negative outlier days are determined (for example, depending of the synthetic target features values). Then drivers are extracted from the days that are labeled good/bad.

4. Step of formulating interventions. From the drivers obtained in step 3 for a single user or for a group of users (population), formulate new interventions based on the determined drivers.

In another embodiment, the method tries all combinations of outlier labeling methods as input features to a model that automatically learns which combinations of labeling approaches achieve the highest levels of accuracy.

In another embodiment, the machine learning model takes into account, besides the outliers in monitored data, statistics based on the positioning of the dataset under analysis in the distribution of values of the input features.

The tables of FIGS. 7 and 8 show the initial experimental results for varying the labeling approaches for user happiness and for user anxiety, respectively, according to an embodiment. For modeling purposes, XGBoost and logistic regression were considered as machine learning techniques, due to their flexibility and general performance. For XGBoost, early stopping on log-loss was used with 10 as the number of rounds, with leaving one user out as cross validation. For logistic regression, a grid search was used for determining the regularization parameter C. SMOTE was used for oversampling the minority class.

The labeling approaches that were explored in the initial results presented below are: a) 3 standard deviations from the mean (j=3), b) 2 standard deviations from the mean (j=3), c) 30 percentile (i=30), d) 20 percentile (i=20), e) 10 percentile (i=10). Data was labeled accordingly as 0 (sad), 1 (happy), and 2 (normal). A binary classification was attempted for both happy versus sad days and for normal versus sad days. The target Normal versus Sad signifies that only days where the synthetic features were labeled as normal or sad were used in the training (to detect only the irregular negative/sad days). The target Sad versus Happy means that only days where the synthetic features were sad or happy were used in the training.

In this example, the models are trained using multiple types of features. The feature types are passive, active and onboarding. The passive group includes features computed from data collected by phone sensors (e.g., accelerometer, noise, light, pedometer, battery, GPS). the active group includes features computed from the user's report of activities. And the onboarding group includes features computed from the user's answers to the onboarding questionnaires (including demographic data). For some of the models, more than one type of feature is used. Some of the models were based on only those users who completed more than ten days of the study. Some of the models set a minimum of two points as the absolute difference between happiness scores that did not improve the results.

The tables of FIGS. 7 and 8 illustrate the need for the novel solution for automatically detecting the optimal labeling approach for the dataset and the individuals under consideration. The top three results for both scenarios (happiness in FIG. 7 and anxiety in FIG. 8) were reached through a combination of labeling approaches, which were different between the inputs and the target features. Note that depending on the dataset (i.e., on the feature), the optimal labeling approach may differ.

Through the combination of the features of the disclosed embodiments, the following advantages (among others) over the existing prior art are achieved:

The outlier days are passively inferred from outliers of input features, in this case not using raw values.
  The optimal labeling approach is applied. Thus, a higher accuracy is achieved for detecting outlier days.
  Personalized drivers of behavior are extracted both from the entire population (group of users) as well as from each individual user's outlier days.

Figure 4:
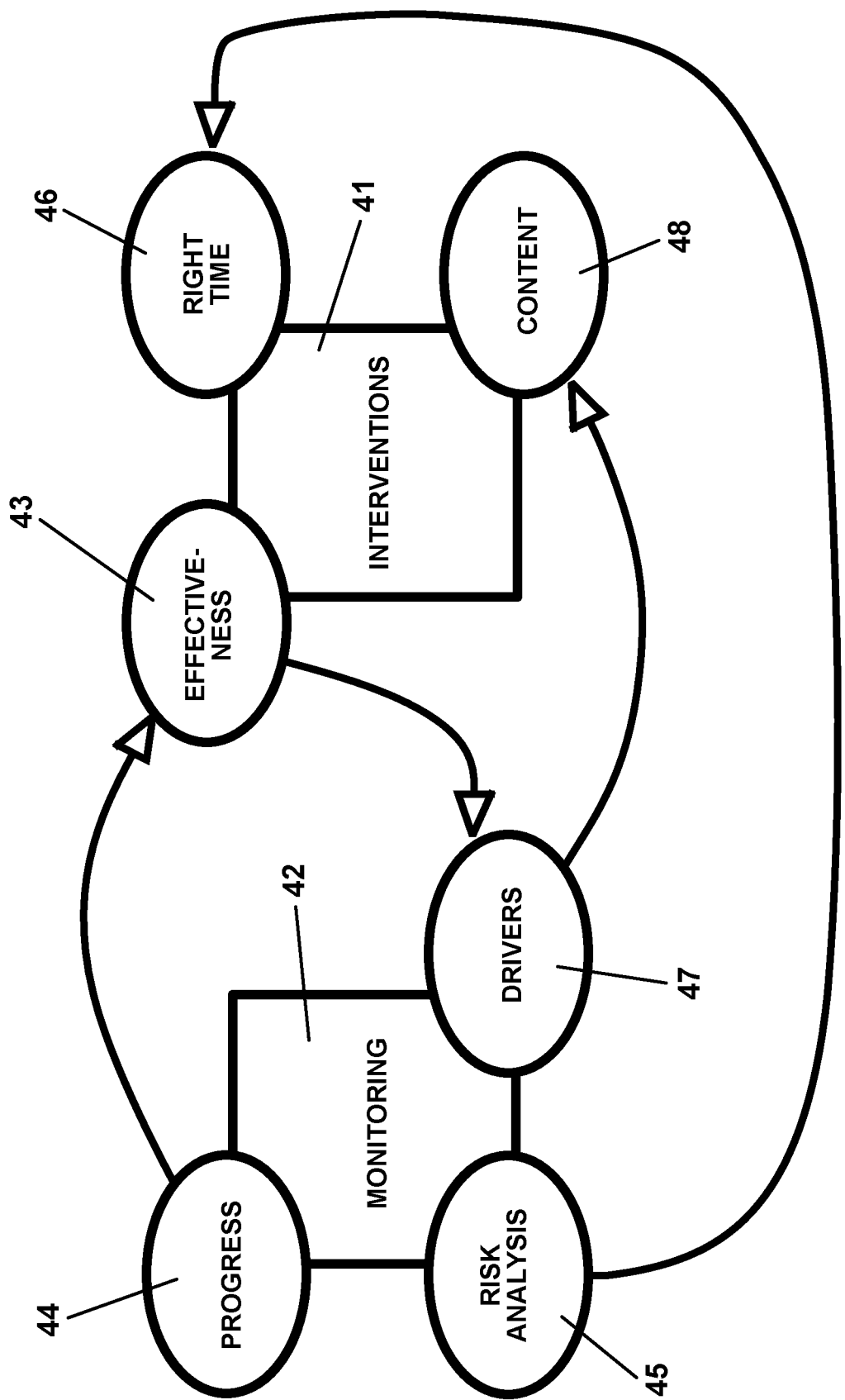
FIG. 4 shows a block flow of possible applications of the results achieved by the disclosed embodiments of the invention.

FIG. 4 shows several examples of possible issues/actions (and the interactions between these issues/actions) that can be performed by the novel method for detecting outlier days (e.g., exceptionally good or bad days).

The method passively assesses interventions (41). In one step, the system monitors (42) the user's behavior and infers his/her outlier days before and after an intervention provides an indication of whether the intervention has been successful. That is, the effectiveness (43) of the intervention is monitored, for example, by inferring good/bad days in terms of stress before and after a stress relieving intervention. The system monitors (42) the user's behavior by detecting his/her outlier days and then provides a visualization of day-to-day progress (44), e.g., to users, clinicians, customers, and for internal evaluations.

Because of the relationship between wellbeing and clinical conditions such as anxiety and depression, detecting exceptionally good or bad days for a user can help to identify individuals who are at risk (45) of developing clinical conditions. Similarly, detecting exceptionally good or bad days can be used for example to detect acute versus chronic stress.

In another step, the system identifies and anticipates when a user is having a worse day than normal so as to determine the right time (46) to intervene with an intervention.

The system can be used to discover the factors that influence the good or bad days.

The activities that people performed during bad and good days serve as guidelines for the interventions and enable good/bad drivers (47) for the user's behavior to be identified. The good/bad drivers are used as the content (48) on which the interventions (41) for improving the user's life are based.

Although the present invention has been described with reference to specific embodiments, it should be understood by those skilled in the art that the foregoing and various other changes, omissions and additions in the form and detail thereof may be made therein without departing from the scope of the invention as defined by the claims. Furthermore, all examples recited herein are principally intended expressly to be only for pedagogical purposes to aid the reader in understanding the principles of the invention and the concepts contributed by the inventors to further the art, and are to be construed as being without limitation to such specifically recited examples and conditions. Moreover, all statements herein reciting principles, aspects, and embodiments of the invention, as well as specific examples thereof, are intended to encompass equivalents thereof. It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes that may be substantially represented in a computer readable medium and so executed by a computer or processor, whether or not such computer or processor is explicitly shown.

What is claimed is:

1. A method for detecting an outlier time period of a user, comprising:
   receiving data corresponding to each of a plurality of features related to the user, wherein the data is acquired over a plurality of time periods by sensors on an electronic device of the user;
   labeling the data acquired on each of the plurality of time periods for each of the plurality of features as being regular or irregular by applying N labeling approaches, wherein N is a positive integer greater than one, and wherein at least one of the N labeling approaches involves comparing the data corresponding to each of the plurality of features with how values of previously acquired data for corresponding features are distributed;
   generating N labels as synthetic features for the data corresponding to each of the plurality of features for each of the plurality of time periods;
   training a machine learning classification model based at least in part on (i) analyzing the synthetic features labeled as irregular for each of the N labeling approaches and (ii) determining a regularization parameter using a grid search; and
   using the machine learning classification model:
      selecting from among the N labeling approaches an optimal labeling approach for each of the plurality of features; and
      determining for each of the plurality of features, using the labels obtained with the optimal labeling approach and by assigning a relevancy to each of the plurality of features, whether each of the plurality of time periods is an outlier time period of the user.

2. The method of claim 1, wherein each of the plurality of time periods is selected from the group consisting of: a day, a work day, a 10-hour period, a week, a month, and a year.

3. The method of claim 1, wherein the plurality of features includes a feature selected from the group consisting of: a usage pattern of the electronic device by the user, location data indicative of a location of the user, environmental data related to the location of the user, physiological data of the user, and behavioral data of the user.

4. The method of claim 3, wherein the location data relates to a parameter selected from the group consisting of: indoor temperature, indoor light level, light exposure, and noise level, wherein the environmental data relates to a parameter selected from the group consisting of: pollution level, outdoor light level, humidity, and outdoor temperature, wherein the physiological data relates to a parameter selected from the group consisting of: galvanic skin response, heart rate variability, and skin temperature, and wherein the behavioral data relates to a parameter selected from the group consisting of: mobility, social interactions, and sleep state.

5. The method of claim 1, wherein one of the N labeling approaches involves comparing the data corresponding to each of the plurality of features with an i and 100-i percentile of a distribution of the previously acquired data for features corresponding to each of the plurality of features, and wherein i is a design parameter.

6. The method of claim 1, wherein one of the N labeling approaches involves comparing the data corresponding to each of the plurality of features with a mean of a distribution of the previously acquired data for features corresponding to each of the plurality of features.

7. The method of claim 1, wherein one of the N labeling approaches involves comparing the data corresponding to each of the plurality of features with a variance of a distribution of the previously acquired data for features corresponding to each of the plurality of features.

8. The method of claim 1, further comprising:
   determining for each of the plurality of features whether each of the plurality of time periods is a positive outlier time period or a negative outlier time period for the user.

9. The method of claim 1, wherein the plurality of features related to the user includes a wellbeing feature of the user.

10. The method of claim 1, further comprising:
generating a recommendation for the user based on the relevancy of each of the plurality of features.

11. The method of claim 1, wherein the selecting the optimal labeling approach for each of the plurality of features is performed in an electronic processing device remote from the user, and wherein the data that is acquired by sensors on the electronic device of the user is transmitted through a communications network to the remote processing device.

12. The method of claim 1, wherein the sensors on the electronic device of the user are selected from the group consisting of: a motion sensor, a location sensor, a temperature sensor, an air quality sensor, a pedometer, a light sensor, a battery level sensor, and an ambient noise level sensor.

13. The method of claim 1, wherein the electronic device of the user is selected from the group consisting of: a mobile phone, a smartwatch, a smartphone, a laptop, a tablet computer, and a personal computer.

14. A system for detecting an outlier time period of a user, comprising:
a receiver that receives data through a communications network from an electronic device of the user, wherein the data corresponds to each of a plurality of features related to the user, and wherein the data is acquired during a plurality of time periods by sensors on the electronic device of the user; and
a computer including a processor, wherein the processor is configured to:
label the data acquired during each of the plurality of time periods for each of the plurality of features as being regular or irregular by applying N labeling approaches, wherein N is a positive integer greater than one, and wherein at least one of the N labeling approaches involves comparing the data corresponding to each of the plurality of features with how values of previously acquired data for corresponding features are distributed;
generate N labels as synthetic features for the data corresponding to each of the plurality of features for each of the plurality of time periods;
train a machine learning classification model based at least in part on (i) analyzing the synthetic features labeled as irregular for each of the N labeling approaches and (ii) determining a regularization parameter using a grid search; and
using the machine learning classification model:
select from among the N labeling approaches an optimal labeling approach for each of the plurality of features using the machine learning classification model; and
determine for each of the plurality of features, using the labels obtained with the optimal labeling approach and by assigning a relevancy to each of the plurality of features, whether each of the plurality of time periods is an outlier time period of the user.

15. The system of claim 14, wherein the plurality of features includes a feature selected from the group consisting of: a usage pattern of the electronic device by the user, location data indicative of a location of the user, environmental data related to the location of the user, physiological data of the user, and behavioral data of the user.

16. The system of claim 15, wherein the location data relates to a parameter selected from the group consisting of: indoor temperature, indoor light level, light exposure, and noise level, wherein the environmental data relates to a parameter selected from the group consisting of: pollution level, outdoor light level, humidity, and outdoor temperature, wherein the physiological data relates to a parameter selected from the group consisting of: galvanic skin response, heart rate variability, and skin temperature, and wherein the behavioral data relates to a parameter selected from the group consisting of: mobility, social interactions, and sleep state.

17. The system of claim 14, wherein one of the N labeling approaches involves comparing the data corresponding to each of the plurality of features with a mean of a distribution of the previously acquired data for features corresponding to each of the plurality of features.

18. The system of claim 14, wherein the sensors on the electronic device of the user are selected from the group consisting of: a motion sensor, a location sensor, a temperature sensor, an air quality sensor, a pedometer, a light sensor, a battery level sensor, and an ambient noise level sensor.

19. The system of claim 14, wherein the electronic device of the user is selected from the group consisting of: a mobile phone, a smartwatch, a smartphone, a laptop, a tablet computer, and a personal computer.

* * * * *